UNITED STATES PATENT OFFICE.

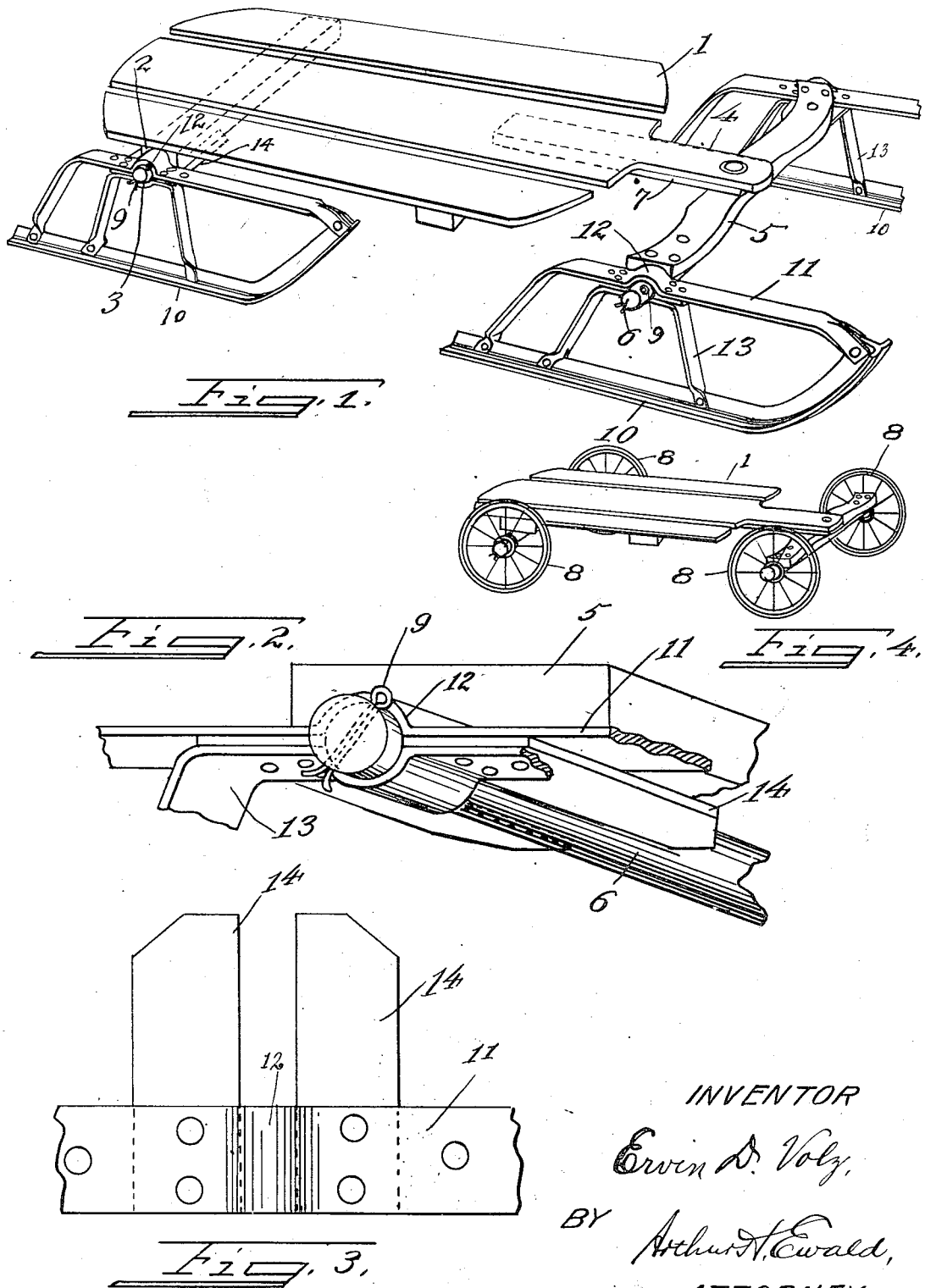

ERVIN D. VOLZ, OF CINCINNATI, OHIO.

CONVERTIBLE COASTER.

1,409,501.  Specification of Letters Patent.  Patented Mar. 14, 1922.

Application filed April 28, 1921. Serial No. 465,140.

*To all whom it may concern:*

Be it known that I, ERVIN D. VOLZ, a citizen of the United States, and resident of Cincinnati, in the county of Hamilton and State of Ohio, have invented certain new and useful Improvements in Convertible Coasters, of which the following is a full, clear, and exact description, reference being had to the accompanying drawings, forming a part of this specification.

The present invention relates to coasters and has particular reference to the provision of a convertible coaster for use either with wheels or snow and ice runners.

The principal object of the present invention is to provide a dirigible coaster which may be used either with wheels or with runners for snow and ice, the change from wheels to runners, or vice versa, being readily effected.

Further objects of the invention will appear from the following detailed description thereof.

In the drawings:

Fig. 1 is a perspective of a coaster constructed in accordance with this invention showing the same provided with the snow and ice runners.

Fig. 2 is a perspective of a detail.

Fig. 3 is a plan view of a detail.

Fig. 4 is a perspective of the device as mounted on wheels.

Numeral 1 indicates the body or bed of a sled or coaster, the same being generally of ordinary construction. The body 1 is provided, near the rear thereof, with an under-brace 2 carrying an axle 3. Pivotally secured to the front neck 4 of the body 1 is a cross-bar 5, carrying rigidly mounted on its under side an axle 6. The neck 4 of the body is reinforced by means of a metal bar 7. The ends of the axles 3 and 6 are adapted to receive wheels 8, the same being secured thereon by means of cotter pins 9, or otherwise, or runners 10 similarly secured on the axles.

The runners 10 are provided with top bars 11, carrying hubs 12. The runners are reinforced by brackets 13, the upper portions of which, as shown in the drawings, may form the under halves of the hubs. The bars 11 of each of the runners are provided with inwardly projecting members or arms 14, which are adapted to abut against the underside of the body 1 on opposite sides of the axle to prevent the runners from turning thereon. It will be understood that one of the runners 10, constructed as above described, is provided in place of each wheel, so that the coaster when used for snow or ice travels on four runners, the front runners serving to guide the coaster by the turning of the cross-bar 5 on its pivotal mounting, the steering being effected by the operator's feet or hands in the usual well-known manner.

From the foregoing description the nature of this invention will be apparent. As will be seen, the change from wheels to snow and ice runners may be readily effected and the device is operated on either the runners or wheels in identically the same manner.

Having thus fully described my invention, what I claim as new and desire to secure by Letters Patent is:—

In a convertible coaster comprising a body and axles on said body, runners arranged to be detachably secured to said axles, and arms on said runners extending inwardly therefrom, said arms being adapted to abut against the under side of said body on opposite sides of the axles to prevent rotation of the runners thereon.

ERVIN D. VOLZ.